United States Patent [19]

MacKay B et al.

[11] 4,196,332

[45] Apr. 1, 1980

[54] CONTROLLED HEATING MICROWAVE OVENS

[75] Inventors: Alejandro MacKay B, Santiago, Chile; Wayne R. Tinga; Walter A. G. Voss, both of Edmonton, Canada

[73] Assignee: Canadian Patents and Development Limited, Ottawa, Canada

[21] Appl. No.: 901,350

[22] Filed: May 1, 1978

[30] Foreign Application Priority Data

Feb. 9, 1978 [CA] Canada .................................. 296944

[51] Int. Cl.² ............................................... H05B 9/06
[52] U.S. Cl. ...................... 219/10.55 B; 219/10.55 R; 219/10.55 F; 331/177 R
[58] Field of Search ................. 219/10.55 B, 10.55 M, 219/10.55 R, 10.55 F; 331/177 R, 88, 90, 175; 307/271; 333/17 R

[56] References Cited

U.S. PATENT DOCUMENTS

| 2,143,891 | 1/1939 | Lindenblad | 331/175 |
|---|---|---|---|
| 2,679,595 | 5/1954 | Spencer | 331/88 |
| 3,047,818 | 7/1962 | Regis | 331/90 |
| 3,461,401 | 8/1969 | Williams | 331/177 R |
| 3,784,781 | 1/1974 | Foerstner et al. | 219/10.55 B |
| 4,009,359 | 2/1977 | Tallmadge et al. | 219/10.55 M |
| 4,035,599 | 7/1977 | Kashyap et al. | 219/10.55 B |
| 4,042,891 | 8/1977 | Levine | 331/175 |
| 4,049,938 | 9/1977 | Ueno | 219/10.55 R |
| 4,115,680 | 9/1978 | Moore | 219/10.55 B |

OTHER PUBLICATIONS

Control of Magnetron Frequency Using Digital AFC, Ramanaiah et al., Electro-Technology (India) vol. 19, No. 3, (Sep. 1975).

Primary Examiner—Thomas J. Kozma
Assistant Examiner—Philip H. Leung
Attorney, Agent, or Firm—Edward Rymek

[57] ABSTRACT

A frequency controlled microwave oven having an oven cavity, a frequency agile microwave source for energizing the oven cavity, a detector for detecting the power absorption in a load at various source frequencies within a bandwidth and a control circuit for setting the microwave source at frequencies as determined by the power absorption levels. The frequencies at which the oven cavity is energized are selected by the control system to obtain high efficiency, i.e. low power reflection from the cavity, and to obtain improved heating uniformity by the superimposing of various heating patterns produced by the different operating frequencies.

9 Claims, 3 Drawing Figures

CONTROLLED HEATING MICROWAVE OVENS

BACKGROUND OF THE INVENTION

This invention is directed to microwave ovens, and, in particular, to efficient and more uniform heating of a variety of loads in microwave ovens.

One of the main attractions of microwave ovens to date has been their time saving capability. However, with the rising cost of energy and the increasing use of microwave ovens, its efficiency is becoming a relevant issue. Commercially available microwave ovens presently have an overall efficiency, i.e. from power line to load, in the order of 40% to 50%. The overall efficiency is, essentially, the product of three factors: power supply efficiency, magnetron efficiency and conversion or circuit efficiency. Typical power supply and magnetron efficiencies can be considered to be 95% and 65% respectively, so for an oven with, for example, 45% overall efficiency the circuit efficiency would be 73%. Losses in converting the power available from the magnetron to heat are due, in part, to losses in the cavity walls and feeding structure, but arise mainly from a poor impedance match between the magnetron and the loaded cavity. This mismatch condition, and hence, the circuit efficiency, is worst for small loads and varies considerably with the position of the load within the cavity.

The efficiency of microwave ovens designed for specific applications can be much higher since they are used to heat specific loads of uniform shape and dielectric constant, U.S. Pat. No. 3,851,131 to Johnson et al and U.S. Pat. No. 3,851,132 to Van Koughnett being typical examples. In addition, this type of device provides greater heating uniformity since the load moves through the cavity.

In domestic, institutional or even industrial microwave ovens, the loads processed vary over a wide range of dielectric properties, shapes and sizes and the choice of operating frequency is limited to the ISM bands, two of which are 915±25 MHz and 2450±50 MHz. This has lead to attempts to improve efficiency and heating uniformity by manipulating the electric field patterns in the oven cavity by changing the physical dimensions of the cavity as in U.S. Pat. No. 3,104,304 to Sawada or by using a mode-stirrer as in U.S. Pat. No. 3,784,781 to Foerstner et al. These efforts have reduced the variation in efficiency for a particular type of load and its position. At the same time, these methods reduce the efficiency due to additional reflection losses.

SUMMARY OF THE INVENTION

It is therefore an object of this invention to provide a microwave oven with improved efficiency and heating uniformity for all types of loads.

This and other objects are achieved in a microwave oven which includes a cavity for receiving the load to be heated, a frequency agile microwave power source coupled to the cavity for providing power to the cavity. The microwave power source operates at a controllable frequency within a predetermined frequency bandwidth. The oven further includes a detector for detecting the power absorption of the load when the cavity is energized, and a control circuit coupled to the detector for determining one or more preferable operating frequencies within the operating bandwidth and for controlling power source to provide output power to the cavity at the preferred frequencies.

In accordance with one aspect of the invention, the detector in the microwave oven includes a device such as a directional coupler for detecting reflected power from the cavity and an element such as a crystal diode for generating a dc voltage proportional to the reflected power.

In accordance with another aspect of the invention, the control circuit controls a voltage tunable power source through a voltage ramp generator. The voltage ramp generator is driven by a sweep and hold circuit which determines the operating cycle duration. The circuit drives the voltage ramp generator to sweep the frequency bandwidth during at least a predetermined first portion of the operating cycle. The control circuit further includes a gating element coupled to the detector for determining the occurrences of reflected power below a predetermined minimum value during the first portion of the operating cycle and a memory coupled to the gating element for storing the occurrences as preferable operating frequencies. The memory is coupled to said voltage ramp generator for controlling the operating frequencies of the tunable power source during a second portion of the operating cycle.

In accordance with a further aspect of this invention, the microwave oven includes a cavity, a frequency agile power source and a controller for controlling the source to provide output power at preselected power levels to the cavity in a sequence of preferred frequencies for predetermined lengths of time.

BRIEF DESCRIPTION OF THE DRAWINGS

In the drawings:

FIG. 3 illustrates a block diagram of the microwave oven system.

DESCRIPTION OF THE PREFERRED EMBODIMENT

In a multimode cavity, the frequency or frequencies at which maximum circuit efficiency is achieved, vary quite drastically with loading conditions. Maximum circuit efficiency and minimum circuit efficiency sensitivity to loading is achieved when the frequency of the source is set to the optimum value for each loading condition. In addition, heating uniformity increases with the number of different modes or field patterns which are excited in the loaded cavity. The microwave oven in accordance with this invention utilizes these principles to improve efficiency and heating uniformity while operating within any of the permissible bandwidths, examples of which are the bandwidths having midband frequencies of 915 MHz, 2450 MHz, 5800 MHz and 22.125 GHz.

Figure 1:
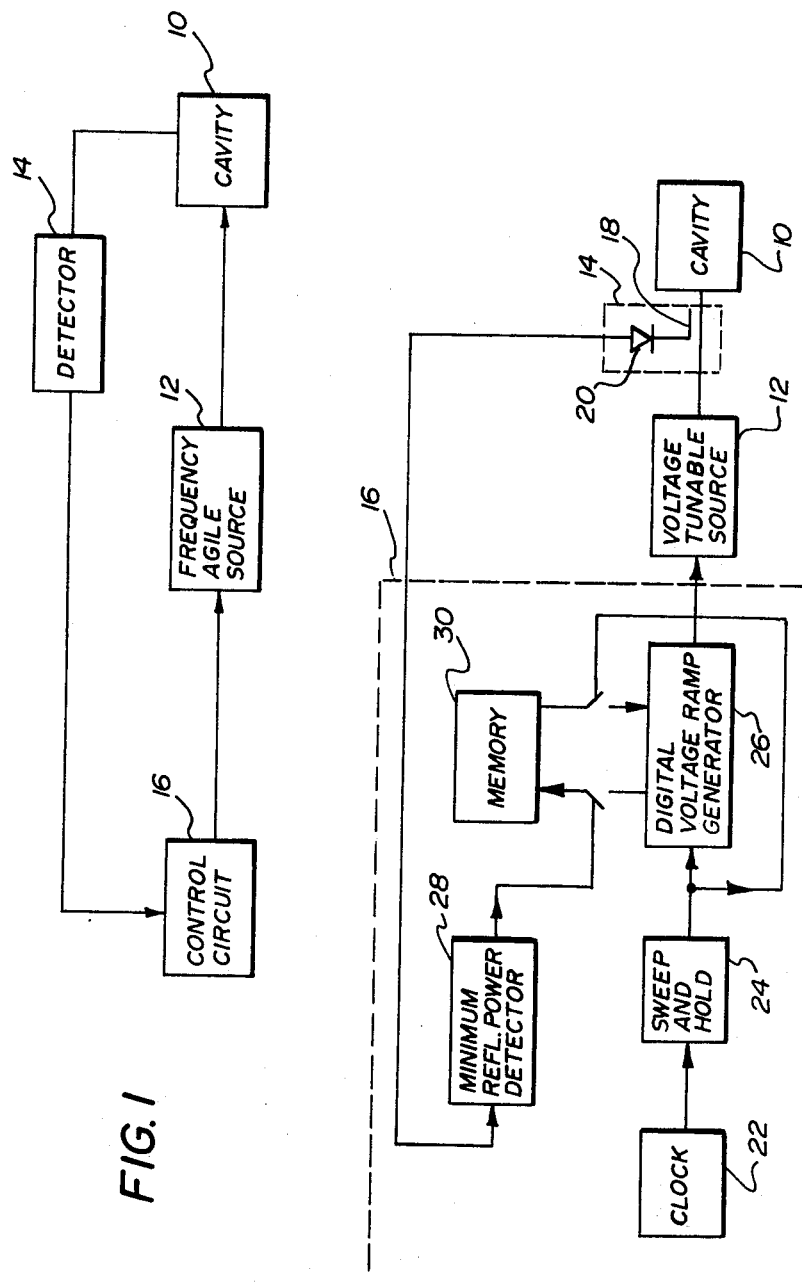
FIG. 1 schematically illustrates the microwave oven system in accordance with the present invention.

Referring in particular to FIG. 1, the microwave oven includes an oven cavity 10, a frequency agile microwave source 12 coupled to the cavity 10, a detector 14 and a control circuit 16. The cavity 10 may be any conventional oven cavity of appropriate dimension. The frequency agile microwave source 12 operates in one of the allowable frequency bandwidths and is preferably controlled to operate at any desired specific frequency within the bandwidth. One example of the frequency agile source 12 is a voltage tunable magnetron (VTM) of the type commercially available from Mictron Inc. Alternately, however, solid state sources such as simple oscillators or oscillator amplifier chains whose frequency is electronically tunable can be used. One such source was described in the publication by E. T. Ebersol, "L-Band Transistor Amplifier Dishes Out 1 KW", Microwaves, Vol. 11, Page 9, December 1972.

Figure 2:
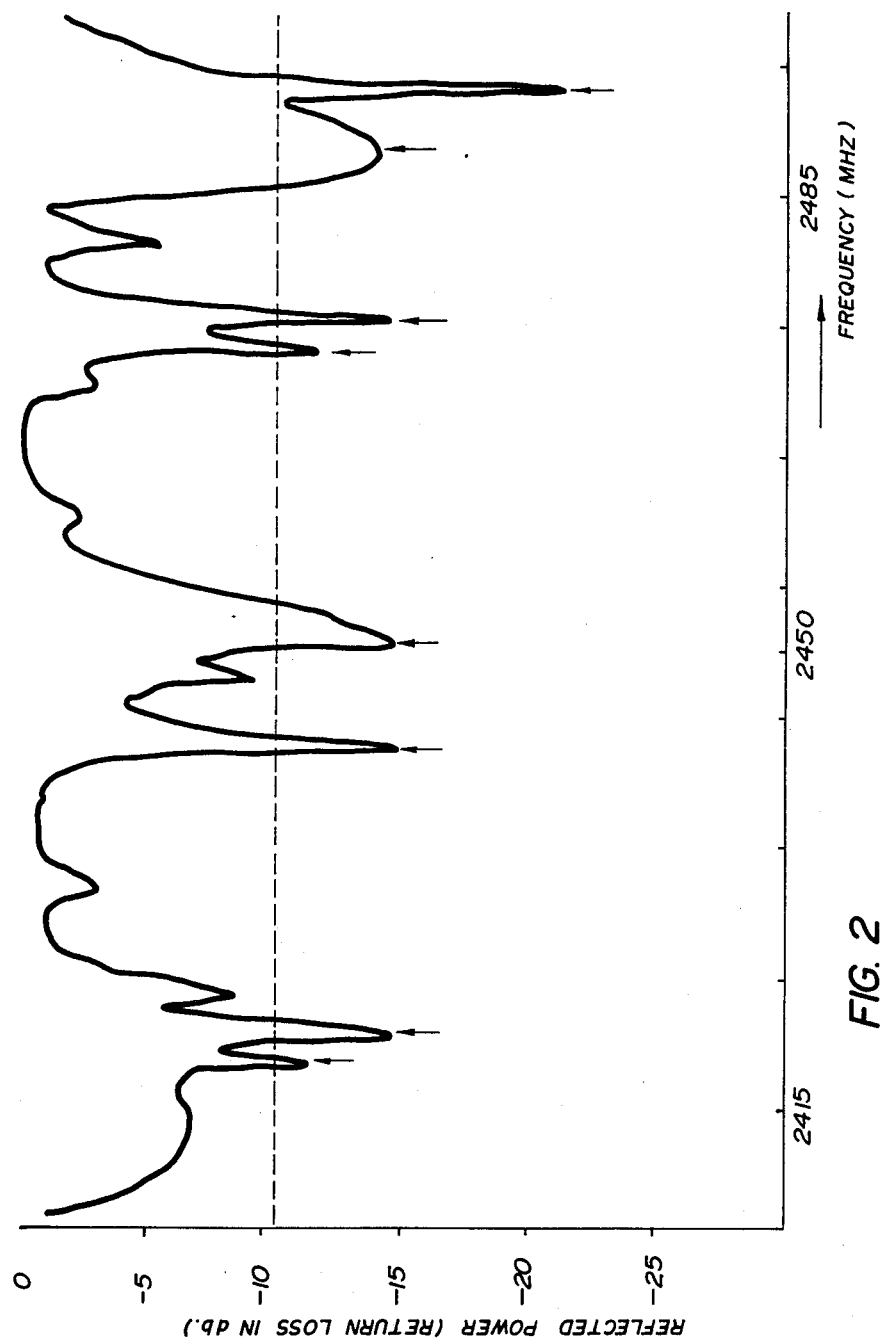
FIG. 2 illustrates a pattern of reflected power versus frequency in the 2450 MHz bandwidth.

The detector 14 and control circuit 16 operate together to control the source 12. The control circuit during a first short period of a cycle causes the microwave source 12 to provide an output to cavity 10 wherein the frequency is swept across the entire bandwidth. As the source 12 sweeps its frequency across the bandwidth, detector 14 detects the power absorption versus the frequency of a particular load in the cavity and provides an output proportional to power absorption by the load, from which the most desireable operating frequency or frequencies are determined. FIG. 2 shows a typical pattern of reflected power versus frequency. The pattern was taken for the case of a 30 c.c. load of water in a laboratory type microwave cavity. The vertical axis indicates increasing reflected power and the horizontal axis indicates increasing frequency as shown. This detector 14 signal is fed to the control circuit 16. The control circuit 16 during the remainder of the cycle then sets the microwave source 12 to sequentially switch from one desireable frequency to another. This cycle may be repeated periodically while heating a particular load, since the load characteristics will change as it is being heated. The number of discrete sequential frequencies through which source 12 is switched will depend on the overall desired circuit efficiency and the desired heating pattern.

When the microwave source with which a cavity is excited has a resistive output impedance, two conditions must be met in order to obtain maximum power transfer: the generator frequency must be equal to that of a loaded cavity resonance and the equivalent loaded cavity input resistance must be equal to the driving impedance. In a multimode cavity and within a given bandwidth, the above conditions are usually met, or at least approached, at several frequencies and their number is larger, the larger the bandwidth and the larger the number of modes that the cavity can sustain in that bandwidth. Without changing circuit parameters by electromechanical tuning or by other means, maximum power transfer and, therefore, highest efficiency is achieved by setting the source to a frequency which yields minimum reflected power.

As can be seen in FIG. 2, the lowest reflection occurs at approximately 2490 MHz and therefore the most efficient source frequency for the specific load at the time of the sweep is 2490 MHz. However, energy distribution within the load will not be uniform if the source is operated at one specific frequency. It is therefore desireable to step through one or more of the relatively efficient frequencies in the bandwidth. In FIG. 2, frequencies having reflection values lower than a preset value of −10 dB are indicated by arrows. In order to establish uniform heating patterns in a load, the frequency agile source can be controlled in many ways. First, the source can be controlled to step through a selected sequence of frequencies. Second, the time of operation at each frequency may vary from frequency to frequency. Third, the power level at each frequency may vary from frequency to frequency. The first method of control leads to greater efficiency while the second method of control leads to more uniform power absorption for the sequence of operating frequencies.

In the embodiment illustrated in FIG. 3, the detector 14 is a directional coupler 18 connected to a crystal diode 20. The directional coupler 18 samples the reflected power from the cavity 10 and the crystal diode generates a dc voltage proportional to the reflected power. A directional coupler with a low coupling coefficient is required to ensure operation of the diode in its square law region.

The control circuit 16 includes a clock circuit 22 connected to a sweep and hold circuit 24 which is connected to a digital voltage ramp generator 26. The ramp generator controls the frequency of the frequency agile source 12. A reflected power detector 28 detects the output voltage from diode 20 and stores in a memory 30, all of the frequencies or ramp voltage values at which the reflected power is below a predetermined value.

In operation, clock circuit 22 provides clocking pulses to the sweep and hold circuit 24. The sweep and hold circuit provides two sequential output signals, the first to control the duration of the sweep portion of the cycle and the second to control the duration of the hold portion of the cycle.

In one mode of operation, the cycle may consist almost entirely of a sweep portion, i.e. the digital voltage ramp generator 26 is controlled to generate a sequential voltage ramp function causing the source 12 to continuously and sequentially sweep the frequency bandwidth. This results in relatively uniform heating of the load, however, does not provide maximum efficiency.

In a second mode, the sweep portion of the cycle may be relatively short as compared to the hold portion, i.e. approximately 100 ms in a period of 5 s. During the sweep cycle, the reflected power detector 28 detects the occurrence of the minimum reflected power and stores this information in memory 30. During the hold portion of the cycle, the memory 30 is coupled to the digital voltage ramp generator 26 to maintain its output at a specific voltage level to maintain the magnetron 12 output at a specific frequency. In this mode, efficiency is very high, however, the uniformity of heating may be poor.

In a third mode of operation, during the sweep portion of the cycle, the reflected power detector 28 detects the occurrences of reflected power below a predetermined minimum and stores the information of each occurrence in memory 30. During the hold portion of the cycle, memory 30 is coupled to the digital voltage ramp generator 26 to cause its output to sequentially step to a number of specific voltage levels thereby controlling the source 12 to provide an output having specific sequential frequencies. The number of sequential frequencies generated by the source 12 may be less than the number of occurrences of reflected power below the predetermined minimum. This number and the duration of the source 10 output at each frequency will be governed by the final temperature pattern desired. The final temperature pattern is the resultant of superimposed individual temperature patterns, each of which is dependent on the source output signal frequency and duration. This mode of operation provides for both improved efficiency and heating uniformity of the load. In addition, the source 12 may be controlled to provide different selected power level outputs at the different frequency, which further improves heating uniformity.

Under certain circumstances, there may be no need to detect the frequencies having minimum power reflection. Therefore, in a fourth mode, the memory 30 may be simply loaded to control the source 12 to operate at preferred frequencies for predetermined lengths of time at preselected power levels and the sweep and hold circuit 24 is made to eliminate the sweep portion of the cycle and operate only the hold portion of the cycle. Changes and modifications in the above described embodiments of the invention can be carried out without departing from the scope of the invention. Accordingly, the scope is intended to be limited only by the scope of the appended claims.

We claim:

1. A microwave oven comprising:

multimode cavity means for receiving a load to be heated;

a controllable frequency microwave power source coupled to said multimode cavity means for providing power to said multimode cavity means, the frequency of said microwave power source being controllable within a predetermined frequency bandwidth;

detector means for providing a detector signal representative of the power absorption of the load as a function of the power source frequency when the cavity means is energized;

control means for controlling the frequency microwave power source during an operating cycle to sweep through the frequencies in the predetermined frequency bandwidth during a first portion of the operating cycle and to operate in a sequence of preferred frequencies during a second portion of the operating cycle; and memory means coupled to the detector means for receiving the detector signal and for storing representations of the preferred frequencies determined during the first portion of the operating cycle, said memory means being coupled to the control means for providing the frequency representations to the control means during the second portion of the operating cycle.

2. A microwave oven as claimed in claim 1 wherein said detector means includes first means for detecting reflected power from said cavity means and second means for generating a dc voltage proportional to the reflected power to provide the detector signal.

3. A microwave oven as claimed in claim 2 wherein said first means is a directional coupler and said second means is a crystal diode.

4. A microwave oven as claimed in claim 1 wherein said control means further controls the output power level of said microwave power source.

5. A microwave oven as claimed in claim 1 wherein said controllable frequency microwave power source is a voltage tunable power source.

6. A microwave oven as claimed in claim 5 wherein said control means includes a voltage ramp generator coupled to said voltage tunable power source for controlling the power source frequencies within the predetermined frequency bandwidth.

7. A microwave oven as claimed in claim 6 wherein said control means includes sweep and hold circuit means for driving said voltage ramp generator during at least the first portion of the operating cycle.

8. A microwave oven as claimed in claim 5 wherein said voltage tunable power source is a magnetron.

9. A microwave oven as claimed in claim 5 wherein said voltage tunable source is a solid state variable frequency source.

* * * * *